July 15, 1969   E. J. FLOWERS ET AL   3,455,139
MACHINES FOR FORMING AND/OR FINISHING METAL WORKPIECES AND GEARS
Filed Feb. 5, 1965   2 Sheets-Sheet 1
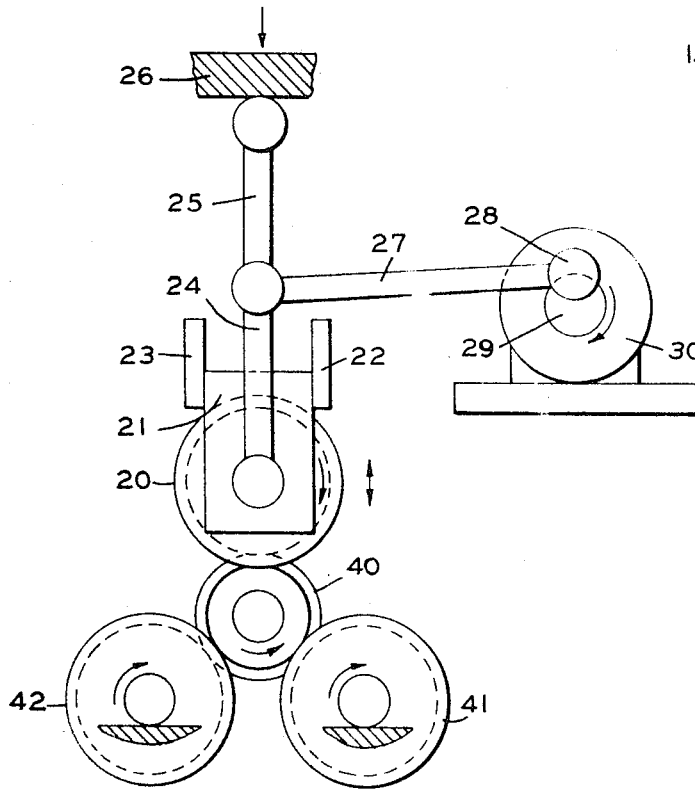
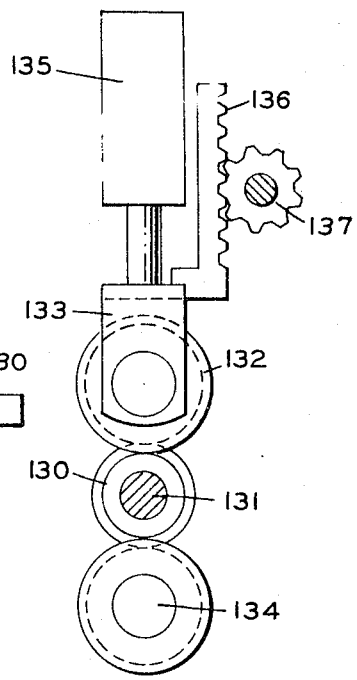
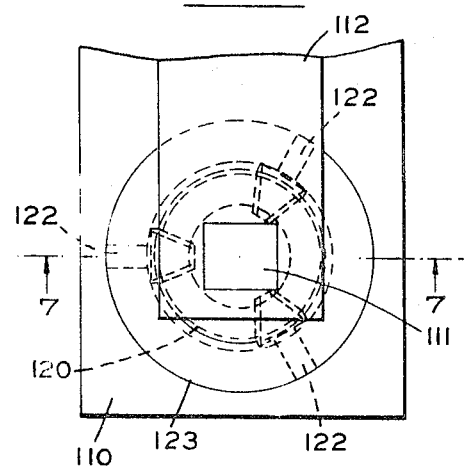
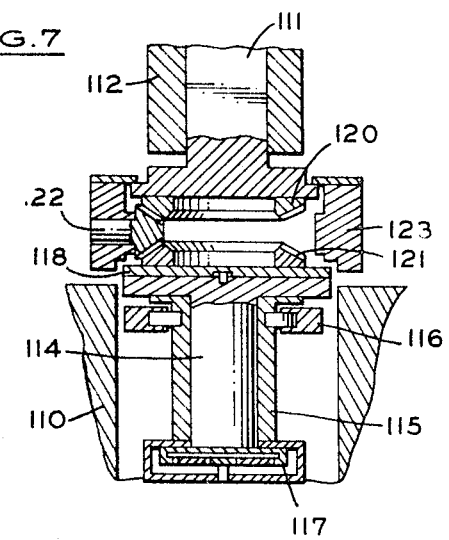
INVENTORS
EDWARD J. FLOWERS
THEODORE E. JOSLIN
BY William T. Sevald
ATTORNEY

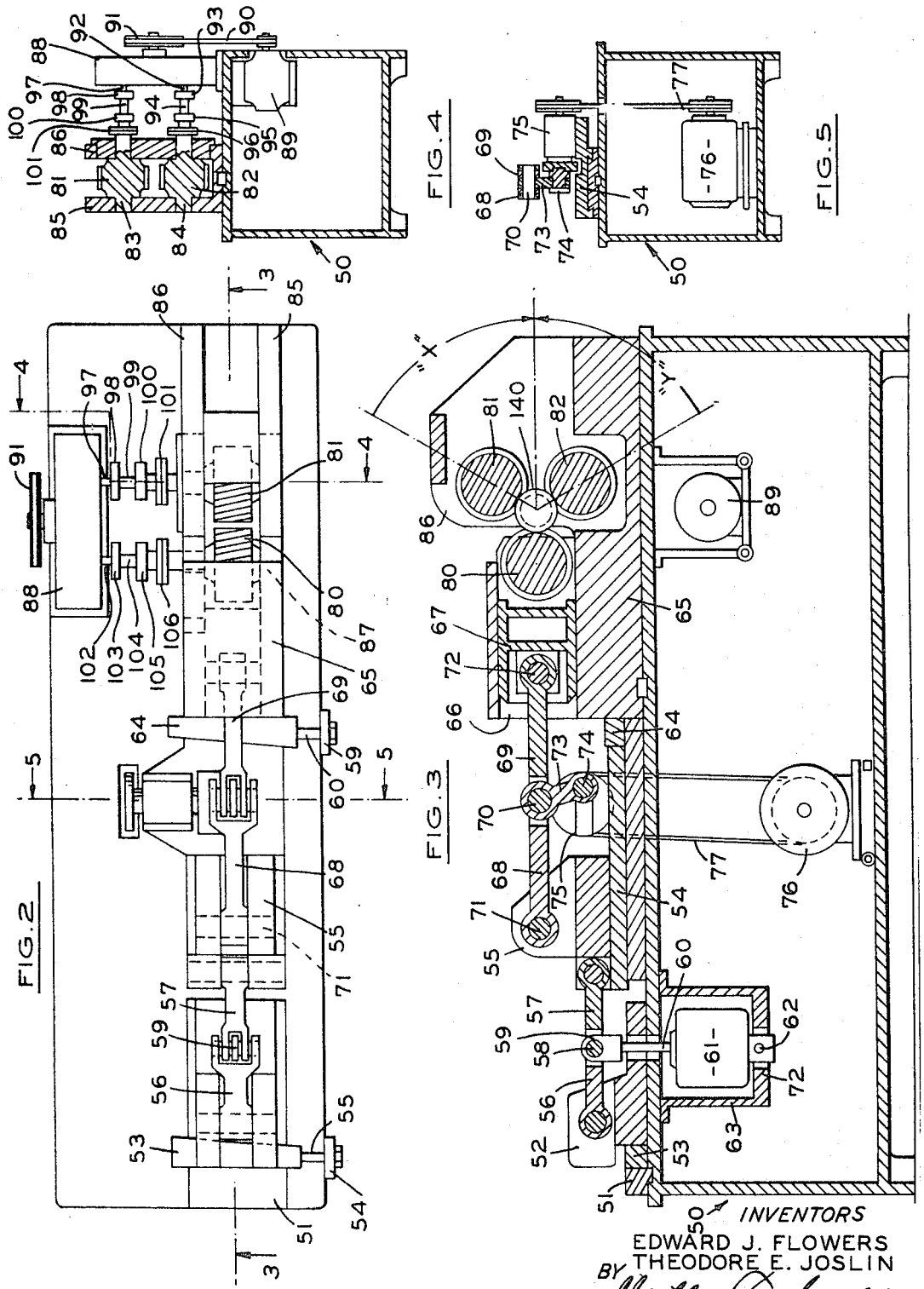

United States Patent Office 3,455,139
Patented July 15, 1969

3,455,139
MACHINES FOR FORMING AND/OR FINISHING METAL WORKPIECES AND GEARS
Edward J. Flowers, Farmington, and Theodore E. Joslin, Lathrup, Mich., assignors of twenty percent to William T. Sevald, Royal Oak, Mich.
Filed Feb. 5, 1965, Ser. No. 430,601
Int. Cl. B21d 37/00; B21j 9/18; B21b 1/00
U.S. Cl. 72—412                                                                            4 Claims

ABSTRACT OF THE DISCLOSURE

In the method and apparatus disclosed herein, a workpiece is brought into engagement with a forming tool, such as a master gear, and the forming tool and workpiece are moved gradually toward one another while they are rotated relative to one another and while there is a rapid oscillation of one of the forming tool and workpiece to provide rolling, sliding, wiping motion between the forming tool and workpiece to thereby form gear teeth in the workpiece. As the formation of the teeth is concluded, further relative vibratory motion combined with rotary motion provides an improved surface finish on the gear teeth which has increased density in the impact surface.

---

This invention relates to metal forming and surface finishing, and in particular to a novel process for forming and finishing gear teeth and for finishing the surfaces of formed gear teeth and to novel machine tool means for practicing the process.

The novel process and means of the invention uses and provides rapidly oscillating means subjecting the metal workpiece to relatively light rapid impacts between the tool and the workpiece. The tool and/or the workpiece are fed toward one another as the impacts occur. The tool and workpiece are also moved angularly or in a plane relative to one another. The work oscillating herein includes vibrating, hammering, impacting, etc. and same may be in a harmonic motion or otherwise.

The invention utilizes the cumulative effect of rapidly occurring relatively small amplitude impacts between the tool and workpiece with each impact moving a small quantity of material in the workpiece to move a large cumulative quantity of material in the workpiece. The relative angular or planar movement between the tool and workpiece as the tool and workpiece are impinged and withdrawn in oscillation changes the direction of the force of the impingement and withdrawal while occurring and this produces a compound impact material moving and directing action between the tool and the workpiece.

Relative movement of the workpiece in conjunction with the relative movement of the tool compounded with the relative oscillation between the tool and the workpiece in the changing tool-workpiece relationship produces the desired directional movement of material in the workpiece to form and/or surface finish the workpiece. This results from the combined action of the tool oscillating and moving relative to the workpiece with the impact and withdrawal force in the angular movement impinging as a vectorial force displacing material in the workpiece in the space occupied by the tool and moving it to a place in the workpiece not occupied by the tool.

The shape of the tool and the angular movement of the tool and workpiece in conjunction with the rolling, sliding, wiping action of the impacts and withdrawals moves the material of the workpiece directionally to form the desired shape on a blank workpiece and/or to finish the surface of rough forms.

The tool impacts are relatively light and rapid and may be considered vibrating in character. The amplitude of the impact may be relatively small. The amplitude may be between .0001 and .025 inch. Each tool impact and withdrawal moves only a small quantity of material in the workpiece from one location to another. The rotational movement of the tool and workpiece disperses the impacts about the peripheral profile or along the tooth profile of the workpiece in both tooth forming and finishing. The forming and finishing takes place progressively in a workpiece with all the peripheral profile of the workpiece being worked upon substantially equally. Thus in a gear workpiece all the teeth are gradually or progressively formed and/or finished to the same extent at any stage of forming and/or finishing.

While examples of oscillatory amplitude are hereinafter stated for explanatory purposes, it will be understood that essentially the tool and workpiece are rolled relative to one another in force-fed engagement while the tool and workpiece are vibrated at a high rate to move the tool relative to the workpiece with the tool causing a movement or flow in the material of the workpiece.

As an example of rolling, wiping, sliding, oscillating or vibrating impact action, the tool may oscillate at the rate of 7,200 per minute with an amplitude of .010 inch. The tool thus travels .010 inch in one 120th of a second. The workpiece may rotate at a speed of 60 r.p.m. describing 21,600 degrees per minute or 360 degrees per second or 3 degrees in one 120th of a second. Thus the tool moves .010 inch while 3 degrees of angular motion occurs.

In another example of impact and forming action, the tool may oscillate at the rate of 21,600 per minute with an amplitude of .005 inch. The tool thus travels .005 inch in one 360th of a second. The workpiece may rotate at a speed of 30 r.p.m. describing 10,800 degrees per minute or 180 degrees per second or .5 degree in one 360th of a second. Thus the tool moves .005 inch while .5 degree of angular motion occurs.

In another example of impact and forming action, the tool may oscillate at the rate of 14,200 per minute with an amplitude of .015 inch. The tool thus travels .015 in one 240th of a second. The workpiece may rotate at a speed of 45 r.p.m. describing 16,200 degrees per minute or 270 degrees per second or 1.125 degrees in one 240th of a second. Thus the tool moves .015 inch while 1.125 degrees of angular motion occurs.

The foregoing examples are not stated by way of limitation as the tool may oscillate at any desired rate, with any desired amplitude, and while moving angularly or otherwise at any desired speed.

As an example of cumulative work effect, while oscillating at the rate of 7,200 per minute with an amplitude of .010 inch, the tool has a total travel of 72 inches per minute; oscillating at the rate of 21,600 per minute with an amplitude of .005 inch the tool has a total travel of 108 inches per minute; and oscillating at the rate of 14,400 per minute with an amplitude of .015 inch the tool has a total travel of 216 inches per minute.

Thus in making or finishing a workpiece, such as an automatic transmission helical gear having a pitch diameter of 2.625 inches, 45 teeth, a pitch of about 17, and a tooth height of about .150 inch, the tool cumulative work effect is highly productive as the total or combined tooth height of the gear is only 6.750 inches whereas the tool cumulative travel may be 72,108, or 213 inches per minute depending on the oscillation rate and amplitude such as stated in the foregoing examples. With the 45 tooth gear, the exemplary rates of oscillation may impact each tooth 160, 480, and 320 times per minute while angular movement of .5 degree, 1.125 degree, and 3 degrees may occur in selected combination. With a force of 10 pounds per impact this force cumulates to 1600, 4800, and 3200 pounds of force exerted on each tooth in the impacts per minute or 45 times these quantities on the gear as a whole. Various impact rates, amplitudes, and forces may be employed as desired in conjucntion with various angular speeds as desired.

The process and means of the invention may be utilized to make and/or finish any type gear such as spur, helical, worms, bevel, hypoid, worm, spline, ring, etc. The process and means of the invention provide many advantages in making and finishing gears as set forth in the following objects.

It is an object of the invention to provide novel machine means for practicing the novel process or method which are simple in design and construction and which are relatively inexpensive to manufacture and which are fast, accurate, inexpensive to operate, highly productive, quality productive, and easy to operate and use.

An object of the invention is to provide a gear tooth forming and/or finishing process and means for practicing the process wherein the tool is lightly impacted against the workpiece so as to flow or more only a small quantity of the material with any one impact to obviate shock, fatigue, and/or adverse change in the grain structure of the workpiece.

It is an object of the invention to provide a simple inexpensive, easy to use, accurate, fast, relatively foolproof, method or process for forming high quality gear teeth on blanks and/or high quality finishing on the surface on unfinished gear teeth.

An object of the invention is to provide a novel process or method and means for making and finishing gear teeth by moving a very small quantity of the material of the workpiece at one place on a workpiece by a light impact and repeating the light impacts rapidly on the workpiece at dispersed places on the workpiece wherein the rapidity of the light impacts with each moving a small quantity of material of the workpiece cumulates in a large quantity of material moved in the workpiece in a time period such as less than a minute for finishing tooth surfaces on rough formed teeth on a gear and a minute or more for fully forming teeth on a gear blank.

An object of the invention is to provide a novel process or method and means for making and finishing gear teeth by rapid light impacting wherein the force of each impact is impinged with a rolling, sliding, wiping relative motion so that each small quantity of material is moved in a direction to shape each gear tooth mass in proper spaced and angular position and relationship to the other teeth and to a gear with which it will mate.

An object of the invention is to provide a process for forming and finishing gears and means therefore wherein the rolling, wiping, sliding impact action produces an improved surface finish on the gear teeth having increased density in the impacted skin of the gear teeth providing high resistance to fatigue failure and good wear conditions and quiet gear life.

An object of the invention is to provide quality gear teeth, quality tooth surface finishes, and quality supporting material and grain structure by moving a minute quantity of material at dispersed locations on a workpiece with the light impacting thereby relieving stresses in the forming process itself and obviating the stresses usually encountered in cold forming with straight applied forces of great magnitude which create shear stresses in the material of the workpiece rather than relieve them.

An object of the invention is to provide rapid impacts such as at or near the harmonic vibration point of the material moving a minute quantity of material wherein the molecular structure of material impacted is excited and the molecules set in motion rendering the material amenably malleable such as in a relatively plastic state so that upon successive light impacts excitation and molecular movement is transferred to adjacent material progressively as the teeth are formed and/or finished so that the gear takes shape by plastic deformation and plastic formation.

An object of the invention is to provide a process and means wherein the applied force at any one point at any one time is only a small portion of the force required for other methods such as applied pressure forming so that the novel process has only a small portion of the shearing action, especially in substrate material, usually inherent in applied pressure technique.

An object of the invention is to provide an impacting process and mean for forming gears utilizing impacting as a non-shearing process rather than as a shearing process as encountered in prior applied pressure methods wherein the small incremental quantities of workpiece material moved in the novel process has the characteristics of joining the molecules or particles of the grain structure in closer conformation and density like or similar to the blacksmith hammering art wherein metal portions are joined by hammering under either hot or cold conditions.

An object of the invention is to provide a process and means wherein the rapid light impacts at any one time and place are so minute and quick that a substantial portion of the force of the impact and the cumulative force effect is absorbed in material movement in the workpiece substantially reducing distorting impacting forces on the machine means including timing elements, bearings, shafts, etc. thereby reducing machine wear and fatigue and increasing machine life.

An object of the invention is to provide a gear tooth forming and/or finishing process and means for practicing the process wherein the blank or unfinished gear is controlled in rotational movement relative to the rotational movement of the impacting tool or master gear and/or the master anvil tool or gear or gears to provide controlled impact dispersement in a pattern on the workpiece similar to working gears thereby developing generated impact points or lines of contact therebetween similar to working gears.

An object of the invention is to provide a gear tooth forming and/or finishing process and means for practicing the process wherein the workpiece and the tool or master gear are angularly controlled relative to one another by mechanical means such as a mandrel in the workpiece and/or a shaft in the master gear angularly moving in timed relationship relative to one another.

An object of the invention is to provide a gear tooth forming and/or finishing process and means for practicing the process wherein the workpiece may be supported by at least one master gear anvil so that the resistance developed between the anvil master gear and the workpiece also lightly impact the workpiece to move minute quantities of material and contribute to tooth forming and/or finishing and wherein the master gears may be positioned in trapping relationship relative to the workpiece such as triangularly or rectangularly or otherwise to contain the workpiece with the master gears angular movement controlling the angular movement of the workpiece by the contact therebetween.

An object of the invention is to provide at least one hardened forming tool such as a master gear as an impacting tool which is rapidly lightly impacted against the malleable relatively soft workpiece while the tool and workpiece angularly move relative to one another so that the rapid light impacts are dispersed on the workpiece and tool and are delivered by the tool to the workpiece in a direction, position, location, and angle similar to meshed gear relationship so that the working relationship high point or line of contact is impinged with light force moving the material constantly away from high points, lines, or places with the rapidity of the impacting and the rapidity of the angular motion between tool and workpiece effecting a substantially constant plastic deformation-formation material flow on the workpiece periphery or profile with the material moving out of portions to provide shaped spaces and into portions to provide shaped teeth.

An object of the invention is to provide a process and means for forming and finishing gear teeth and means therefore wherein the gears are finished functionally in that the gear teeth are formed and/or finished-shaped in the same manner in which they operate as gears resulting in normal errors or tolerances being compensated for on the workpiece in the actual operational plane.

An object of the invention is to provide a process and means wherein there is multiple tool surface contact relative to a workpiece surface so that inaccuracies in the workpiece gear teeth and finished surface will be substantially less than any inaccuracies of the master gear or gears because of the multiple contact.

An object of the invention is to provide a process and means having hunting tooth action and wherein the angularly controlled or centerlessly floating of the workpiece relative to the master gear or gears occurs in conjunction with the hunting tooth action and light impact dispersion and results in averaging out master gear inaccuracy relative to the workpiece so that inaccuracy of the workpiece teeth relative to one another is substantially less than that of the master gear or gears.

An object of the invention is to provide a process and means wherein centerless floating is utilized to obviate conforming relationship between the center of a master gear or gears and the center of a workpiece singly or in combination thereby eliminating extraneous distortion forces.

These and other objects of the invention will become apparent by reference to the following description of a process or method and means for practicing same embodying the invention taken in connection with the accompanying drawings, in which:

FIG. 1 is a schematic view illustrative of suitable impacting means and illustrative of practicing the process showing a master gear as the impacting forming tool and two master gears as the anvil tools with the workpiece floatingly trapped between the triangular orientation of the master gears.

FIG. 2 is a top plan view of a machine embodying the novel means for forming and/or finishing gear teeth illustrating suitable feed, oscillation, and workpiece holding and rotating means.

FIG. 3 is a longitudinal cross-sectional view of FIG. 2 taken on the line 3—3 thereof.

FIG. 4 is a transverse cross-sectional view of FIG. 2 taken on the line 4—4 thereof.

FIG. 5 is a transverse cross-sectional view of FIG. 2 taken on the line 5—5 thereof.

FIG. 6 is a top plan view of the device seen in FIG. 7 showing means for making hypoid ring gears and/or pinion gears.

FIG. 7 is a vertical cross-sectional view of FIG. 6 taken on the line 7—7 thereof; and FIG. 8 is a schematic view of another embodiment of suitable means for practicing the process of the invention.

Reference is now made to the drawings wherein like numerals refer to like and corresponding parts throughout the several views. Referring to FIG. 1, the principles of the novel process and the structure and operation of the novel means of the invention are schematically shown for clarity and ease of explanation and understanding. The invention is first described herein relative to finishing the surfaces of a gear having rough formed gear teeth and later described relative to forming a gear from a blank.

A relatively hard master gear 20 is employed as the impacting forming tool. An oscillating head 21 rotatably supports the master gear 20. Ways 22 and 23 channel the head 21. The head 21 and master gear 20 are oscillated. They may be oscillated by any suitable means such as pneumatic, hydraulic, electric, and/or mechanical. The oscillatory motion may be harmonic or otherwise. In the illustrative embodiment of FIG. 1, a first toggle link 24 having opposite ends is pivotally connected to the head 21 at one end. A second toggle link 25 having opposite ends is pivotally connected to the other end of the first toggle link 24 at one end. A reaction base feed slide 26 is pivotally connected to the other end of the second toggle link 25. The feed slide 26 is movable relative to the ways 22 and 23 to advance and retract the head 21 and master gear 20. An arm 27 having opposite ends is pivotally connected at one end to the inter-connected ends of the toggle links 24 and 25. A crank 28 on a shaft 29 is pivotally connected to the other end of the arm 27. A motor 30 rotates the shaft 29 at a desired speed.

In rotation of the shaft 29 by the motor 30, the crank 28 throws from one side to the other side of the center of the shaft 29. This reciprocates the arm 27. The reciprocation of the arm 27 moves the inter-connected ends of the toggle links 24 and 25 to either side of the center position indicated in FIG. 1. This shortens the toggle link extension from the base feed slide 26. This retracts the oscillating head 21 and master gear 20 in the withdrawal direction of reciprocating movement. The reciprocation of the arm 27 from either side of center to the center position indicated lengthens the extension of the toggle links 24 and 25 from the base feed slide 26. This advances the oscillating head 21 and master gear 20 in the advance direction of reciprocating movement.

The amplitude of the oscillatory movement of the tool or master gear 20 is a combined function of the length of the toggle links 24 and 25 and the length of the throw of the crank 28. The oscillatory rate of movement of the tool or master gear 20 is a function of the speed of the shaft 28 and the number of times the toggle links extend and retract per shaft revolution which in this instance is two. The master gear 20 has a number of teeth, such as 98. The master gear 20 rotates while oscillating, such as at a speed of 36 r.p.m.

A relatively soft workpiece 40 lies adjacent the master gear 20 in line with the line of feed of the feed slide 26. Advancing the feed slide 26 moves the master gear 20 toward the workpiece 40. The motor 30 may travel with the feed slide 26. The workpiece 40 may be supported by suitable means such as by an arbor, a spindle, a chuck, or a collet relative to the master gear 20. In the embodiment of FIG. 1, master gears 41 and 42 are employed as anvils and are triangulated with the master gear 20 to entrap the workpiece 40. The master anvil gears 41 and 42 may be fixed for a certain application or may be advanced and retracted by suitable means in conjunction with the feed of the master gear 20 such as for different applications similar to a three jaw chuck to center the workpiece 40. The master anvil gears 41 and 42 also rotate and may have the same number of teeth as the master gear 20 for present clarity of understanding. However, they may have a different number of teeth.

First describing the finishing of tooth surfaces, the workpiece 40 may have a number of rough formed teeth, such as 45. The workpiece 40 lies against the anvil master gears 41 and 42 in meshing relationship. The feed slide 26 is advanced and the master gear 20 is brought into highly engaged meshing relationship with the workpiece 40. The master gears 20, 41, and 42 and the workpiece 40 are then rotated in meshing relationship. The motor 30 is energized and the head 21 and master gear 20 oscillated. The feed slide 26 is then advanced gradually bringing the oscillating master gear 20 into gradually advancing impacting relationship with the workpiece 40 as both the master gear 20 and the workpiece 40 rotate. A stop is provided relative to the feed slide 26 so that over feeding will not occur. A timer or limit switch is used to shut down the operation after a time period or after the feed slide 26 is advanced to the proper location so that over working will not occur. A short time period is required such as 10 to 50 seconds to finish the tooth surfaces of the workpiece 40.

Referring back to the oscillatory rates and rotational speeds previously described as examples, such as the third or last example, the master gear oscillates at the rate of 14,400 oscillations per minute and the workpiece rotates at a speed of 45 r.p.m. As the workpiece has 45 teeth, it moves angularly one tooth per second with each tooth receiving 240 impacts and withdrawals each second with a rolling, sliding, wiping impact motion. As each impact has an amplitude of .015, in 240 impacts, each tooth is surface worked 3.6 inches per second. As the tooth is only about .150″ high, it is obvious that the strokes of .015 amplitude are generously overlapped resulting in an extremely smooth polished compacted surface finish being imparted to the workpiece teeth in the finishing process.

The magnitude of the cumulative work effort will be understood from considering that in a short ten second time period, the work performed is ten times that outlined above. From this it can be readily understood that the finishing process is very fast.

The embodiment of FIGS. 2–5 is now described prior to describing the process of making gears completely from blanks. A machine 50 conveniently may have feed means, oscillation means, and workpiece holding and rotating means. The machine is shown horizontally oriented but it may be oriented as desired, such as vertically or at an angle.

The feed means may comprise an anchor block 51 secured to the machine 50. A feed reaction foot 52 has a bottom portion adjacent the anchor block 51. A movable tapered pillow block 53 lies between the anchor block 51 and the bottom portion of the foot 52. A hand wheel 54 turns a screw 55 in a nut on the pillow block 53. By turning the hand wheel 54, the tapered pillow block 53 is moved between the anchor block 51 and the foot 52 and this adjusts the position of the feed reaction foot 52 to control and adjust the in-feed of the tool in the machine. Suitable securing means are then tightened holding the head 52 in the adjusted position.

A feed slide 54 rests on the machine 50 spaced from the foot 52. An oscillation reaction base 55 is fixed on the slide 54. Feed control toggle feed links 56 and 57 at their adjacent ends are pivotally inter-connected by a pin 58. The remote ends of the links 56 and 57 are respectively pivotally connected to the foot 52 and the base 55. An arm 59 is carried by the pin 58. A piston rod 60 is fixed to the arm 59. A cylinder 61 pivoted at 62 on a hanger 63 actuates the piston rod 60, arm 59, and links 56 and 57.

Upward movement of the piston rod 60 from the indicated position in the drawings cocks the feed control links 56 and 57 upwardly and this shortens their extension. This pulls the slide 54 and oscillation reaction base 55 toward the foot 52 and this retracts the tool feed. In feeding the tool, the cylinder 61 is metered fluid under pressure and this moves the piston rod 60 downwardly at at controlled rate. This moves the interconnected ends of the links 56 and 57 downwardly from the upwardly cocked position to their indicated straight line position. The links 56 and 57 increase their extension in this movement feeding the oscillation reaction base 55 away from the foot 52 toward the other end of the machine 50. The arm 59 is adapted to abut the machine 50 when the links 56 and 57 are in straight line alignment with maximum extension. Thus by actuating the cylinder 61, the slide 54 and the oscillation reaction base 55 are advanced and retracted to advance and retract the tool relative to the workpiece. Any suitable means may be used to feed the slide and the reaction head as commonly employed in the machine tool art. A tapered pillow block stop 64 lies between the feed slide 54 and the bed of the machine 50 and provides an adjustable positive stop relative to tool in-feeding by the feed slide 54 and the feed means.

The oscillating means may comprise a machine bed 65 having a channel 66. An oscillating head 67 is slidably housed in the channel 66. A pair of toggle links 68 and 69 are pivotally inter-connected at their adjacent inner ends at 70. The outer ends of the links 68 and 69 respectively are pivotally connected to the oscillation reaction base 55 at 71 and to the oscillating head 67 at 72. An actuating arm 73 has one end of pivotally connected to the inter-connected adjacent ends of the links 68 and 69 at 70. The arm 73 has an extending end. A crank shaft 74 is pivotally connected to the extending end of the arm 73. Drive means 75 are mounted on the slide 54 and rotatably support the crank shaft 74. A motor 76 is pivotally mounted on the machine 50. A belt 77 running between the motor 76 and the drive means 75 turns the drive means.

The oscillating means are located on the feed slide 54 so that when the feed means advance and retract the feed slide 54, the oscillating means also feed in and out. The oscillating means may thus be fed and retracted while oscillating. Energizing the motor 76 turns the oscillation drive means 75 through the belt 77. This rotates the crank shaft 74 which reciprocates the actuating arm 73. The reciprocation of the actuating arm 73 moves the pivot 70 back and forth through the center position indicated in the drawings lengthening and shortening the extension of the toggle links 68 and 69 relative to the reaction base 55. This oscillates the oscillating head 67. A forming tool such as a master gear 80 is rotationally mounted on the head 67. This oscillates the master gear 80 relative to the workpiece. While operable oscillation means are disclosed and described, other oscillation means may be employed such as pneumatic, hydraulic, electric, and other mechanical means singly and in combination within the purview of the means and process of the invention. The oscillatory means may be harmonic, or otherwise such as percussion, hammering, vibratory, etc.

The workpiece holding and rotating means of the machine 50 may comprise a master gear 81 and a master gear 82. The master gears 81 and 82 may be considered as anvils or reaction counterparts of the master gear 80. A spindle 83 supports the master gear 81 and a spindle 84 supports the master gear 82. A side plate 85 and a side plate 86 on the machine 50 support the spindles 83 and 84. A spindle 87 supports the master gear 80 on the oscillating head 67. The master gears 80, 81, and 82 thus are supported for rotational movement.

A rotational drive assembly 88 is mounted on the mahcnie 50. A motor 89, a belt 90, and a pulley 91 drive suitable reduction gearing in the drive assembly 88. Three drive splines may extend from the drive assembly 88 in substantially axially aligned relationship with the master spindles 83, 84, and 87. A splined sleeve 92 fits over one of the drive splines and connects to the spindle 84 through a first universal joint 93, a shaft 94, a second universal joint 95, and an angular adjustment coupling 96. A splined sleeve 97 fits over one of the drive splines and connects to the spindle 83 through a first universal joint 98, a shaft 99, a second universal joint 100, and an angular adjustment coupling 101. A splined sleeve 102 fits over one of the drive splines and connects to the spindle 87 through a first universal joint 103, a shaft 104, a second universal joint 105, and an angular adjusting coupling 106. The universal joints are paired and off-set to obviate any increase or decrease in speed. The couplings allow the machine operator to adjust the master gear angular relationship for timing and also provide a range for workpiece size, tooth thickness, etc.

The drive assembly 88 when driven by the motor 89 thereby rotates the master gears 80, 81, and 82 at the same angular rate. The master gears 80, 81, and 82 are triangularly oriented to trap a workpiece 140 as shown and the workpiece may lie centerlessly, on centering means, be rotated by the master gears, and/or be rotated by the drive assembly 88, singly and in combination as desired. The workpiece 140 in the immediately following operational description may be considered to be trapped centerlessly and to be rotated by its contact with the master gears.

In the gear forming operation, the feed means are retracted to back-off the tool master gear 80 relative to the anvil master gears 81 and 82. The workpiece 140 is placed as indicated in FIG. 3 and the feed means advanced until the master gear 80 engages the workpiece 140 and, in turn, holds the workpiece against the master gears 80 and 81. The drive assembly 88 is then energized and this rotatationally drives the master gears 80, 81, and 82 and they in turn rotate the workpiece 140.

The oscillating means are then energized and this oscillates the master gear 80. The feed means are then actuated and the feed slide 54 and oscillating means including the master gear 80 are fed toward the workpiece 140. The feed toward the workpiece 140 continues until the feed slide 54 abuts the stop 64. In finishing tooth surfaces on rough formed teeth on the workpiece 140, the in-feed of the master gear 80 may be relatively short and fast. In forming teeth on a workpiece not having teeth, the in-feed may be relatively longer and also slower. The finishing of surfaces on teeth has been previously described relative to FIG. 1 and the finishing of teeth on the machine 50 therefore will be understood. The forming of gear teeth on an untoothed blank is now described.

An annular gear blank having a suitable diameter is used as the workpiece. The diameter of the blank may be as required, such as close to or at the pitch diameter of the gear when finished. For purpose of explanation and understanding, it may be accepted as given that the gear blank has a diameter substantially the same as the pitch diameter of the finished gear. Thus the workpiece blank may have an outside diameter of 2.625". The gear to be formed may be as previously stated and have 45 teeth of a tooth height of about .150 inch, and a pitch of about 17. To form the gear from the blank it will be necessary therefore to move material out of the locations between the teeth to be formed radially inside the pitch diameter to create spaces between the teeth radially inside the pitch diameter. This is done by displacement. In the process, the material displaced from the spaces is moved into the location of the adjacent teeth. This added quantity of material together with the quantity of material originally in the tooth location supplies the material needed in the tooth location to form the tooth radially outwardly of the pitch diameter.

Considering the pitch diameter is at the center of the tooth height with the gear of the example as a given condition, it will be understood that material to a depth of .075 inch will be moved or displaced in the tooth spaces and that the location of the teeth will be built up or expanded or extended to a height of .075 inch. This is only by way of example as the volume of the spaces between the teeth may be different than the volume of the gear teeth on the gear. Thus it will be understood that the blank diameter usually is something more or less than the pitch diameter of the gear to be formed on the blank.

The triangular disposition of the master gears 80, 81, and 82 may be equal such as at 120 degrees. The relative angularity of the master gear 80 may be measured at its axis in final in-feed position. However it may be found advantageous to vary the angular relationship somewhat such as at 123, 119, and 118 degrees. This may be designed in the machine 50 or provided for in the machine 50 by suitable adjusting means at the spindles supporting the master gears.

This material displacement and resultant transfer movement occurs progressively in the workpiece 140 with the material being gradually displaced to form the spaces and gradually moved and built-up in the tooth locations to form the teeth. In the forming operation, the locations of the spaces are radially and angularly indented progressively with the material of the indentation being moved progressively into the location of the teeth. This adds to the material in the locations of the teeth with a building or mushrooming or ballooning reaction gradually occurring in the location of the teeth.

At the beginning of the forming process the spaces between the teeth are only slightly indented and the location of the teeth only, slightly built up. This condition obtains about the entire peripheral profile of the workpiece to substantially the same degree. As the forming process continues, the spaces between the teeth are progressively enlarged and the locations of the teeth progressively built up. This condition also obtains about the entire peripheral profile of the workpiece to substantially the same degree. At the termination of the forming process, the spaces between the teeth are fully indented and formed and the locations of the teeth are fully built up and formed. The final forming of the spaces and the teeth also achieves its finished or terminal state about the entire peripheral profile of the workpiece substantially equally and substantially at the same time.

Thus it will be understood that work progresses on all the spaces between the teeth and on all the teeth during the forming process rather than work being done on one tooth and space at a time.

Thus the simultaneous angular movement of the tool or master gear 80 and the workpiece 40 in conjunction with oscillation of the master gear 80 and in conjunction with feeding the master gear 80 into the workpiece 140 develops an impacting and withdrawing wiping sliding rolling vibratory metal moving action wherein the tool moves through the workpiece shaping the workpiece and also wherein the workpiece moves through the tool shaping itself, with the work being done on all the spaces and all the teeth at a progressive rate.

Reference is now made to FIGS. 6 and 7 showing a portion of a vertically oriented machine. It will be understood that any of the means of the invention may be disposed vertically, horizontally, or at an angle as desired.

A machine bed 110 supports the various elements of the machine. An oscillating head 111 is located on the machine bed 110 by suitable rotational, oscillatory, and feed means. A guide 112 on the bed 110 supports the head 111 in its movement. A spindle 114 is rotatably positioned on the bed 110 in spaced alignment with the head 111. A sleeve 115 supports the spindle 114 on the bed 110. The spindle 114 may be rotated by the ring 116. Speed reducer means 117 lie between the sleeve 115 and the spindle 114 to drive the spindle rotationally. A centering plate 118 lies on the spindle 114 and provides angular adjusting means between the gearing connected to the head 111 and the spindle 114. Locking means such as bolts may secure the adjusted position of the plate 118.

First describing making hypoid pinion gears, a forming tool such as a master hypoid ring gear 120 is carried by the head 111. A like hypoid master gear 121 is carried by the spindle 114 on the plate 118. A carrier ring 122 surrounds the hypoid master gear tools 120 and 121. Hypoid pinion gear workpiece blanks 122 are located by the carrier ring 123 between the master gears 120 and 121. The carrier ring 123 may be driven rotationally by timed gearing or be moved rotationally by the rolling action between the master gears 120 and 121 and the pinion blanks 122.

In operation, the spindle 114 and the head 111 are rotated and if desired the carrier ring 122 is rotated by gearing. The head 111 is then oscillated and fed toward the spindle 114. This occasions a rolling, wiping, sliding impacting action on the workpiece blanks 122 by the master gear 120 on the oscillating head 111 forming the blanks 122 to the shape and conformation of hypoid pinion gears.

Conversely, describing the making of hypoid ring gears, various arrangement may be employed. In one arrangement the elements 122 may be master hypoid pinion gears firmly meshing with the master ring gear 120. The carrier ring 123 and master pinion gear tools 122 may oscillate with head 111 and master ring gear 120. The element 121 may be a hypoid ring gear blank. In another arrangement both the elements 120 and 121 may be hypoid ring gear blanks. In another arrangement the elements 121 and 122 may be master ring gear and master pinion gear tools and the element 120 may be a hypoid ring gear blank.

Referring now to FIG. 8, a workpiece blank 130 is supported on a mandrel 131. The mandrel may be firmly supported and may have enlarged bearing surfaces. The workpiece 130 may be centered and may be rotationally driven by the mandrel 131. The forming tool may be a master gear 132 oscillated with a head 133 on which it is mounted for free rotational movement. The contact between the rotationally driven workpiece 130 and the master gear 132 may rotationally move the master gear 132. A rack 136 and a pinion 137 may directly feed the head 133 and tool 132. Other suitable feed means may advance the head 132 such as a screw jack, a cylinder and piston rod, etc. A fluid actuated hammer 135 or other suitable means may oscillate the head 133 and master gear such as pulsating fluid columns, vibrating beams, vibratory hammers, etc. A second master gear 134 may be fed and oscillated against the workpiece 130 in opposition to the master gear 132. Obviously the master gears may be rotationally driven in timed relationship with the workpiece. The workpiece 130 also may be driven rotationally in timed relationship or the workpiece may be rotated by the contact with a master gear 132 and/or 134. The axis of oscillation of the master gears 132 and 134 may be offset to develop hunting tooth action.

It will be understood that the forming tools i.e. the master gears, have a tooth shape which is not necessarily identical ot the gear being formed or to a gear with which the gear being formed will mate. The tooth shape of the master gear tool is coordinated to the relative size and relationship between itself and the gear blank to make teeth on the gear blank of desired size and characteristics. The number of teeth in a master gear is selected so that they are not multiples of and preferably do not have a common denominator with the number of the teeth being formed on the workpiece thereby insuring that different teeth are in engagement on the tool and workpiece and thereby reducing the probability or incidence of the same teeth engaging. Thus the teeth formed on a workpiece are formed on an averaged or composite profile of a large number of master gear teeth.

Various forming tools besides master gears may be used within the purview of the novel means and the novel process of the invention. The novel means and process of the invention provides high speed production forming and/or finishing of simple or intricately shaped gears having quality surface finish and quality supporting substrate material.

While only a few embodiments of the novel process and means for practicing the process have been illustrated and described in detail, it is obvious that many changes may be made in the various elements of the invention and in the size, shape, detail, and arrangement of the various elements of the invention within the scope of the appended claims.

We claim:
1. A machine for making gears forming a workpiece having a relatively unformed surface comprising
a forming tool,
means for holding said forming tool,
means for holding a workpiece having a relatively unformed surface to be formed with the unformed surface adjacent said forming tool,
means for successively feeding one said forming tool and workpiece to successive positions toward the other to provide contact and relative in-feed therebetween,
means for rotating at least one said forming tool and said means holding the workpiece so that said forming tool and workpiece rotate relative to one another, and
means for oscillating one said forming tool and workpiece to develop forming impacts between said forming tool and a workpiece,
said means for holding, rotating, feeding, and oscillating said tool and said workpiece relative to one another being operable at the same time so that said forming tool and workpiece rotate relative to one another similar to meshed gears under rolling, sliding, wiping conditions while the oscillating forms impacts between said tool and the workpiece to move material in the workpiece with the material movement of the workpiece moving under the directional influence of the rolling, sliding, wiping conditions to form teeth and spaces between the teeth on a workpiece,
said oscillating means comprises a toggle link arrangement.

2. A machine for making gears forming a workpiece having a relatively unformed surface comprising
a forming tool,
means for holding said forming tool,
means for holding a workpiece having a relatively unformed surface to be formed with the unformed surface adjacent said forming tool,
means for successively feeding one said forming tool and workpiece to successive positions toward the other to provide contact and relative in feed therebetween,
means for rotating at least one said forming tool and said means holding the workpiece so that said forming tool and workpiece rotate relative to one another, and
means for oscillating one said forming tool and workpiece to develop forming impacts between said forming tool and a workpiece,
said means for holding, rotating, feeding, and oscillating said tool and said workpiece raletive to one another being operable at the same time so that said forming tool and workpiece rotate relative to one another similar to meshed gears under rolling, sliding, wiping conditions while the oscillating forms impacts between said tool and the workpiece to move material in the workpiece with the material movement of the workpiece moving under the directional influence of the rolling, sliding, wiping conditions to form teeth and spaces between the teeth on a workpiece,
said feeding means comprises a first toggle link arrangement and said oscillating means comprises a second toggle link arrangement interposed between said first toggle link arrangement and said one forming tool and workpiece.

3. A machine for making gears forming a workpiece having a relatively unformed surface comprising
a forming tool,
means for holding said forming tool,
means for holding a workpiece having a relatively unformed surface to be formed with the unformed surface adjacent said forming tool,
means for successively feeding one said forming tool and workpiece to successive positions toward the other to provide contact and relative in feed therebetween,
means for rotating at least one said forming tool and said means holding the workpiece so that said forming tool and workpiece rotate relative to one another, and
means for oscillating one said forming tool and workpiece to develop forming impacts between said forming tool and a workpiece,
said means for holding, rotating, feeding, and oscillating said tool and said workpiece relative to one another being operable at the same time so that said forming tool and workpiece rotate relative to one another similar to meshed gears under rolling, sliding, wiping conditions while the oscillating forms impacts between said tool and the workpiece to move material in the workpiece with the material movement of the workpiece moving under the directional influence of the rolling, sliding, wiping conditions to form teeth and spaces between the teeth on a workpiece,
said forming tool comprises a pair of hypoid ring gears, said workpiece being interposed between said ring gears,
said feeding means being operatively connected to one of said ring gears,
and said oscillating means being operatively connected to the other of said ring gears.

4. A machine for making gears forming a workpiece having a relatively unformed surface comprising
a forming tool,
means for holding said forming tool,
means for holding a workpiece having a relatively unformed surface to be formed with the unformed surface adjacent said forming tool,
means for successively feeding one said forming tool and workpiece to successive positions toward the other to provide contact and relative in feed therebetween,
means for rotating at least one said forming tool and said means holding the workpiece so that said forming tool and workpiece rotate relative to one another, and
means for oscillating one said forming tool and workpiece to develop forming impacts between said forming tool and a workpiece,
said means for holding, rotating, feeding, and oscillating said tool and said workpiece relative to one another being operable at the same time so that said forming tool and workpiece rotate relative to one another similar to meshed gears under rolling, sliding, wiping conditions while the oscillating forms impacts between said tool and the workpiece to move material in the workpiece with the material movement of the workpiece moving under the directional influence of the rolling, sliding, wiping conditions to form teeth and spaces between the teeth on a workpiece,
said forming tool comprises a hypoid pinion gear,
said workpiece comprising a pair of annular ring blanks engaged with said hypoid pinion fear,
said oscillating means being operatively connected to one of said blanks,
said feeding means being operatively connected to the other of said blanks.

References Cited

UNITED STATES PATENTS

| | | | |
|---|---|---|---|
| 1,001,799 | 8/1911 | Anderson | 72—102 |
| 2,658,259 | 11/1953 | Aldino et al. | 29—90.90 |
| 2,934,980 | 5/1960 | Grob et al. | 72—95 |
| 3,261,192 | 7/1966 | Saito et al. | 72—452 |

LEONIDAS VLACHOS, Primary Examiner

U.S. Cl. X.R.

72—76, 352, 365, 412, 451